(12) United States Patent
Sinn

(10) Patent No.: US 10,505,809 B1
(45) Date of Patent: Dec. 10, 2019

(54) OBJECT-BASED PREFIX AND ATTRIBUTE DISTRIBUTION FOR NETWORK DEVICES

(71) Applicant: Amazon Technologies, Inc., Seattle, WA (US)

(72) Inventor: Frederick David Sinn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 29 days.

(21) Appl. No.: 15/716,245

(22) Filed: Sep. 26, 2017

(51) Int. Cl.
*H04L 12/24* (2006.01)
*H04L 12/751* (2013.01)
*H04L 12/701* (2013.01)
*H04L 12/715* (2013.01)
*H04W 84/18* (2009.01)

(52) U.S. Cl.
CPC ........ *H04L 41/0889* (2013.01); *H04L 41/082* (2013.01); *H04L 41/0823* (2013.01)

(58) Field of Classification Search
CPC ......... H04L 41/12; H04L 45/02; H04L 45/00; H04L 45/04; H04W 84/18
USPC .......................................................... 370/254
See application file for complete search history.

(56) References Cited

U.S. PATENT DOCUMENTS

| 2007/0165543 A1* | 7/2007 | Joo ......................... H04L 45/02 370/254 |
| 2011/0033183 A1* | 2/2011 | Doverspike ........ H04Q 11/0062 398/49 |
| 2011/0128888 A1* | 6/2011 | Buob ..................... H04L 45/02 370/254 |

\* cited by examiner

*Primary Examiner* — Gbemileke J Onamuti
*Assistant Examiner* — Sanjay K Dewan
(74) *Attorney, Agent, or Firm* — Klarquist Sparkman, LLP

(57) ABSTRACT

A protocol can be used to share routing information with neighbor network devices in the form of related objects of attributes and prefixes. The attribute object includes a set of unique attributes that are known for a given prefix or prefixes, but without including the prefixes within the attribute object. The attribute object includes an identifier of the attribute object for future reference by other messages. The prefix object includes one or more prefixes and the associated attribute identifier common to the prefixes. In the case where a subset of prefix or prefixes change so as to have new attributes associated with them, then a re-advertisement of the prefixes with the new attribute identifier is generated. In this way, routing updates become more efficient resulting in peers only needing to update the attribute object or the prefix object.

20 Claims, 11 Drawing Sheets

US 10,505,809 B1

OBJECT-BASED PREFIX AND ATTRIBUTE DISTRIBUTION FOR NETWORK DEVICES

BACKGROUND

Network routers can be used to forward data packets from a source computing device to a destination computing device in a computer network. In larger networks, a data packet may be routed through multiple routers before reaching its ultimate destination. When one router transmits a data packet to a neighboring router in the network, the transfer can be referred to as a "hop." When a router receives a data packet and identifies a neighboring router to which the data packet should be transmitted, it can be said to have identified a "next hop" for the data packet. At least some routers are configured to determine next hops for data packets using routing tables. A routing table can be used to determine associations between network address prefixes and next hops to which data packets matching the network address prefixes should be routed. Network routing protocols exist that enable routers to build routing tables and converge on a shared network topology. Example routing protocols include the Border Gateway Protocol (BGP), the Open Shortest Path First protocol (OSPF), and the Intermediate System to Intermediate System protocol (IS-IS).

Previous strategies for converging on a shared network topology include transmitting route advertisements between routers in a fully meshed network, or using a route reflector to reflect route advertisements sent from one router to all other routers connected to the route reflector. In some protocols (such as BGP) each router maintains a routing information base (RIB) where the router stores all received route information in an on-board memory. The router may then use the information in the RIB to generate a routing table that contains a set of selected next hops for various network address prefixes. There is a desire to expedite convergence for any network changes. Large numbers of prefixes can cause convergence delays resulting in slowing of the overall network throughput or even packet loss.

DETAILED DESCRIPTION

Figure 1:
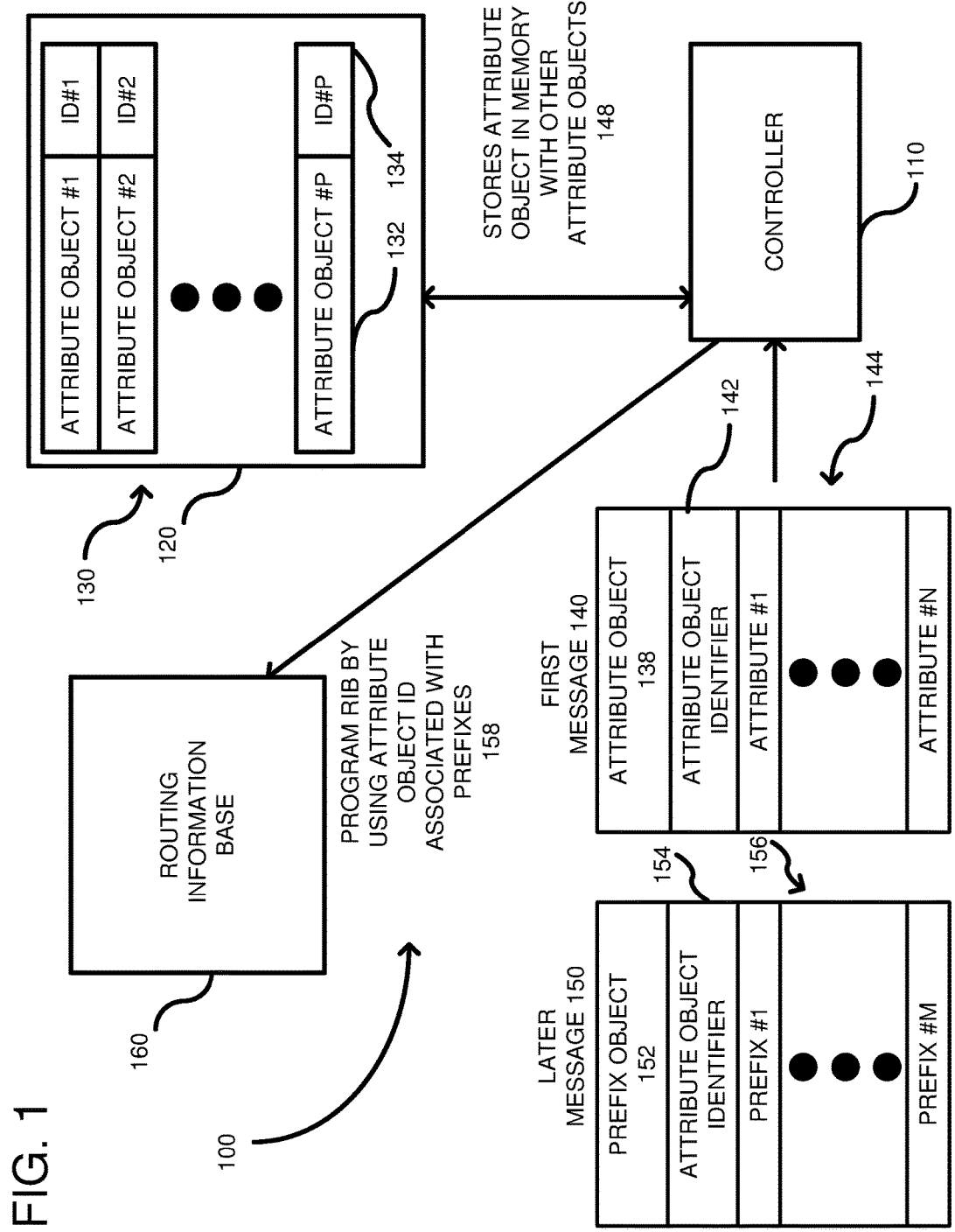
FIG. 1 is a system diagram according to one embodiment for distributing an attribute object and a prefix object.

Current routing protocols share information elements, which are a combination of a prefix and associated attributes used for programming forwarding information in a network device. In most networks, multiple prefixes share identical attributes. Nonetheless, the attributes are re-transmitted with prefix updates even when the attributes have not changed. Additionally, if attributes change for multiple prefixes, an update message in BGP re-transmits all of the attributes and associated prefixes, which leads to inefficiencies as the prefixes are redundant information that was not changed.

A protocol can be used to share routing information with neighbor network devices in the form of related objects of attributes and prefixes. The attribute object includes a set of unique attributes that are known for a given prefix or prefixes, but without including the prefixes within the attribute object. The attributes used can depend on the protocol, but in the case of a protocol that interacts with BGP, the attributes can include Next Hop, Weight, Local Preference, AS Path, Origin Type, MED, Cluster-list, etc. The attribute object includes an identifier of the attribute object for future reference by other messages. The prefix object includes one or more prefixes and the associated attribute identifier common to the prefixes. In the case where a subset of prefix or prefixes have new attributes associated with them, then a re-advertisement of the prefixes with a new attribute identifier is generated. In this way, routing updates become more efficient resulting in peers only needing to update the attribute object (such as when the reach-ability of prefixes change), or the prefix object (such as when a new route is added or an old route is removed). This reduces the volume of data to be exchanged between peers as redundant information is no longer sent. Additionally, a greater number of prefixes can be updated at one time because more prefixes can fit into an update message with only an Attribute-ID.

A second order effect of using attribute and prefix objects is that it reduces the level of processing required by the receiving nodes by comparison to existing protocols, such as BGP. Today, BGP creates a separation of attribute from prefix in memory. In so doing, a node independently determines a ranked set of attributes and then later matches the ranked set to the prefixes to create the forwarding table. However, updates from peers can introduce wholly new attributes for a given prefix when an update is received. As a result, a confirmation of the in-memory mapping is required using existing techniques. Because there are a limited number of prefixes that can be sent in any one BGP update, the interim processing of the updates can create multiple attribute sets and a partial update of the prefixes mapped to them as each message is processed, only to end up having moved all of the prefixes from one attribute set to another as the multiple updates are processed. Using attribute and prefix objects reduces or eliminates this problem as mapping is already inherent in the protocol and all of the prefixes that are associated with the attribute change are transmitted in a single update, which removes the localized processing optimization.

FIG. 1 is an embodiment showing a network device 100 receiving an attribute object and a prefix object in separate messages and using the received objects to populate a routing information base (RIB) within the network device. In any of the examples described herein, a network computing device or, more simply, network device is any device that includes input/output ports and is configured to route packets there through. Example network devices include routers, switches, bridges, etc. A router can be a computing device configured to receive and forward data packets within a computer network and/or between computer networks. In at least some embodiments, a router can be referred to as a switch. The router can be configured to create and maintain a routing table based on routing protocol messages received via one or more computer networks. The router can comprise multiple communication ports connected to other routers (and/or other types of computing devices). The router can be configured to receive data packets from other routers (and/or other computing devices) via the one or more of the communication ports. The router can use data contained in the data packets and the routing table to identify next hop routers (and/or other computing devices) for the data packets and to transmit the data packets to the identified next hops via one or more of the communication ports.

The network device 100 can include a controller 110. The controller 110 can be a Central Processing Unit (CPU), processor, application-specific integrated circuit (ASIC), microcontroller, or any hardware logic that can receive packets and provide switch management and control in response thereto. The controller 110 manages a memory 120 within the network device 100. The memory 120 can be a Dynamic Random Access Memory (DRAM), Flash memory, or other type of RAM or ROM. The memory 120 can store a plurality of attribute objects, shown generally at 130. The attribute objects are labeled as attribute object 1 through attribute object P (where P is any integer number). Each attribute object includes an attribute section 132 and an ID section 134. The attributes section 132 includes a plurality of attributes, but without identifying associated prefixes. The ID section 134 can be any identifier that uniquely identifies the attribute object in the local environment of the network device 100. Example identifiers can be a simple numbering system or more complex identifiers, such as a Globally Unique Identifier (GUID).

The controller 110 can receive the attribute objects in message updates, such as a first message 140. The message 140 is an attribute object 138 that includes an attribute object identifier 142 and a plurality of attributes 1-N (where N is any integer number), shown generally at 144. Although not shown, the message can include other fields, such as a type field indicating that the type of message is an attribute object and other fields, such as a length field so that the attribute object is parsable by the controller 110. When the controller 110 receives the message 140, it can store the attribute object 138 together with the attributes 144 and the identifier 142 in the memory 120, as shown at 148. In this way, the memory 120 includes a list of attribute objects 130 that are searchable using the attribute ID section 134 as a key. Thus, the controller 110 can build an attribute object database in the memory 120 that includes a list of attribute objects 130 and their associated identifiers, such as identifier 134. Notably, the attribute objects can be independent of prefixes.

A subsequently received message 150 can be a prefix object 152. The prefix object 152 does not include attributes associated with the prefixes. Rather, it includes an attribute object identifier 154 (or multiple attribute object identifiers) that points to one of the attribute objects 130 within the memory 120. Additionally, the prefix object 152 can include a plurality of prefixes, shown generally at 156. Using the attribute object identifier 154, the controller 110 can assign attributes within one or more of the attribute objects 130 to the list of prefixes 156. Using the prefixes 156 and the assigned attributes using the attribute object identifier 154, the controller 110 can program 158 a routing information base (RIB) 160. The RIB 160 can include the prefixes and their associated attribute objects. Alternatively, the RIB can include the prefixes and the attribute object identifier. As described further below, the RIB can be used to program the network device's forwarding information base (FIB) (not shown in FIG. 1, but shown in FIG. 3).

To update prefixes with new attributes, a new attribute object can be transmitted to update the list of attribute objects 130. By doing so, the prefixes associated with the attribute object can automatically be updated without transmitting any additional prefixes. Likewise, new prefix objects can be used to add or change prefixes without sending additional attributes. The object-based model of separating prefixes from attributes allows efficient updates without re-transmission of information that was previously received.

Figure 2:
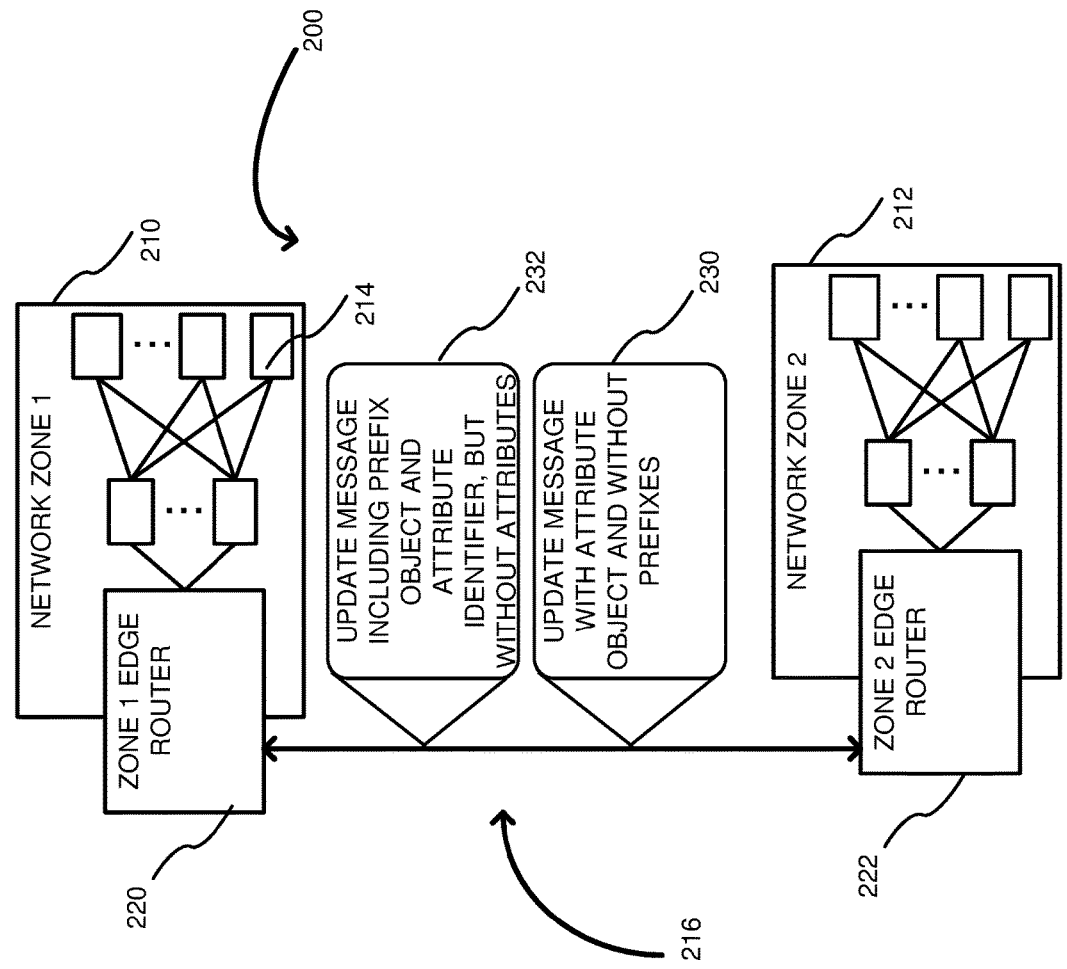
FIG. 2 shows distributing an attribute object and a prefix object between network zones.

FIG. 2 shows a computer network 200 including a plurality of network zones 210, 212 and update messages, shown generally at 216, passing between the network zones. Although not shown, there are typically intermediate network devices between the network zones 210, 212. In any of the examples described herein, a network zone can be a group of networked computing devices (such as routers), such as shown at 214, that can be identified as an origin for one or more network address prefixes. As an origin for a network address prefix, a network zone can be regarded by routers in the network as an ultimate destination for data packets destined for network addresses that begin with the network address prefix. Example network address prefixes include IP address prefixes, routing masks, subnet masks, etc. Example network zones include separate availability zones, data centers, subnets, border gateway protocol (BGP) autonomous systems (AS), etc. In practice, any group of networked computing devices that can be identified as a destination for a given network address prefix can be a network zone. One or more computing devices in a network zone can generate routing protocol messages 216 that are transmitted through a computer network and/or between computer networks. The generated routing protocol messages 216 can identify routes through the computer network that can be used by routers in the network to transmit data packets towards computing devices in the network zone. Typically, the computing devices within the network zone all have a same policy applied by an administrator of the network zone.

Each network zone 210, 212 includes a zone edge router 220, 222, respectively. In any of the examples described herein, a network zone edge router (or edge router) 220, 222 can be a router configured to provide a point of entry for a given network zone. A network zone edge router can be configured to route data packets received from computing devices external to the network zone to computing devices within the network zone. The network zone edge router 220, 222 can also be configured to route data packets received from computing devices internal to the network zone to computing devices external to the network zone. In some embodiments, a combination of BGP and a new protocol can be used and the network zone edge router 220 can translate messages from BGP to the new protocol. For example, communications between the edge routers can be in BGP, while messages within a network zone can be in a protocol supporting the update messages described herein with attribute objects and prefix objects. A router that is external to the network zone can be referred to as a non-zone router. An edge router can be configured to transmit route advertisement messages (such as BGP NLRI UPDATE messages, or the like) to external routers that identify network address prefixes for which the edge router can act as a next hop in the routing of data transmissions. The routing protocol messages 216 can be update messages and can be in any desired protocol, such as BGP, OSPF, IS-IS, future developed protocols, etc.

The update messages 216 can include an attribute object message 230 and a prefix object message 232. In this case, the messages 216 are being transmitted from edge router 220 to edge router 222 and it is desirable to have the attribute object to be received prior to the prefix object. For example, returning to FIG. 1, with the attribute object 138 received first, the attributes objects database 120 can be updated prior to receiving the prefix object 152. In this way, the RIB can be programmed upon receiving the prefix object. Otherwise, the RIB could change if the attribute object 138 is received after the prefix object 152. In any event, the update message 230 includes attributes without associated prefixes. The prefix object 232 can include prefixes without associated attributes. As previously described, once the attribute object is received, its attributes can be stored in association with an attribute identifier. The prefix object 232 can then include any attribute identifier that was previously sent to correlate the prefixes to particular attributes. In some embodiments, only a router that previously generated an attribute object can properly identify that attribute object in a prefix object. Conversely, identifiers of attributes can be transmitted between network devices so that multiple network devices understand the attribute object identifiers together with their associated attributes.

Figure 3:
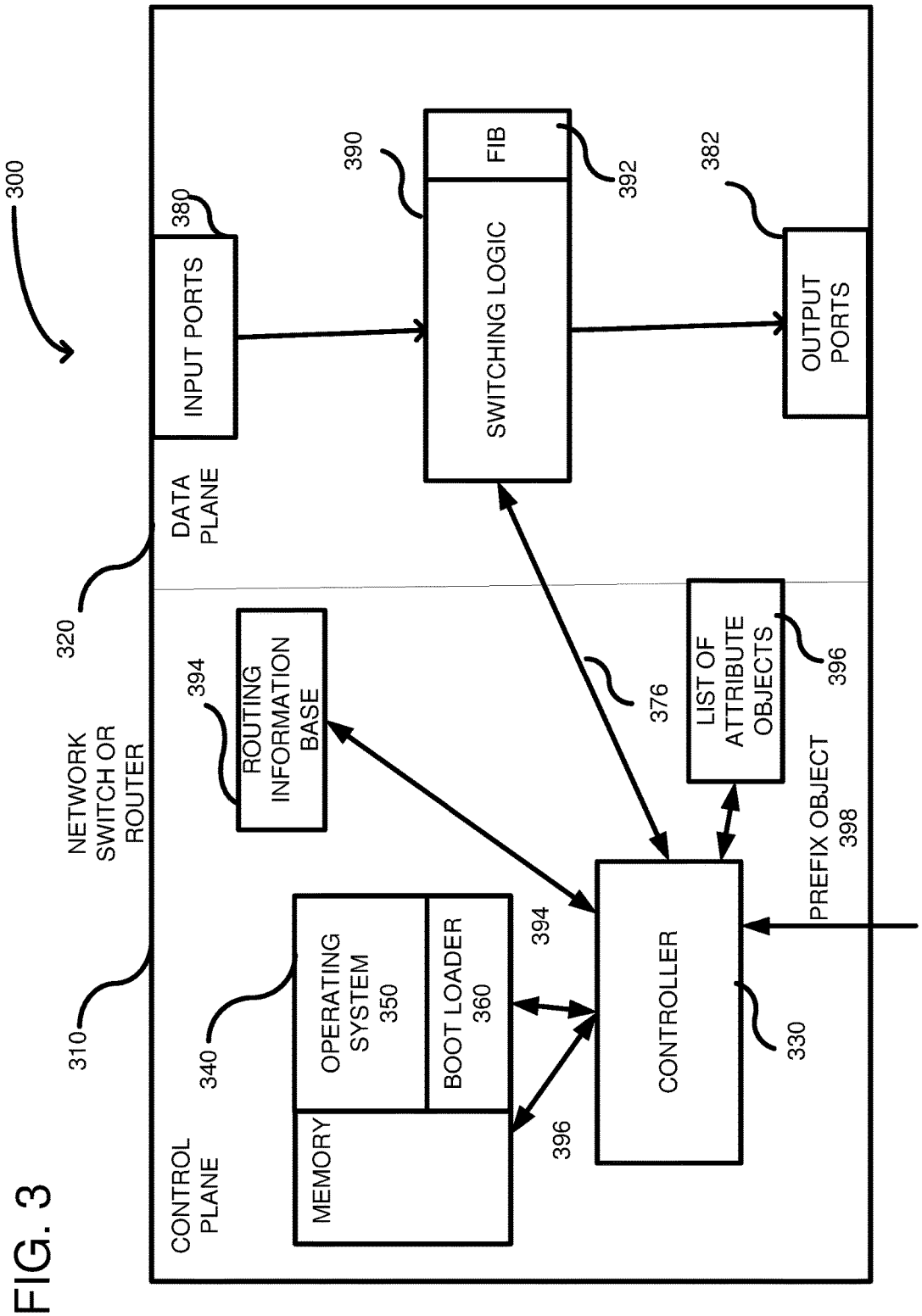
FIG. 3 is an example network device, such as a router or switch, which uses the prefix and attribute objects to program a data plane of the network device.

FIG. 3 is a first embodiment of a network device 300 (e.g., router or switch) that is used for forwarding packets to neighbor network devices. The network device 300 includes a control plane 310 and a data plane 320. The control plane 310 is generally a management layer for configuring, updating, and controlling the data plane 320. The control plane includes a controller 330, which can be a Central Processing Unit (CPU), processor, application-specific integrated circuit (ASIC), microcontroller, or any hardware logic that can receive packets and provide switch management and control in response thereto. The controller 330 has access to a memory 340 that can be a Dynamic Random Access Memory (DRAM), Flash memory, or other type of RAM or ROM. The memory 340 is used to store an operating system 350 for the switch 300. The memory 340 may also include a boot loader program 360, which is a first program executed after a reboot of the controller 330, and which can run basic hardware tests before booting up the operating system 350 (booting up or to boot up means to initialize software associated with a module or component and bring it to an operational state). Although a single memory is shown, the memory 340 can be divided into multiple memories and even memories of different types. A communications bus 376 allows communications between the controller 330 and the data plane 320. The communications bus 376 can be any desired bus type, such as PCI, PCIe, AGP, etc. The data plane 320 includes input port 380 and output port 382 used for receiving and sending network packets, respectively. Switching logic 390 is positioned intermediate the input and output ports. The switching logic 390 includes hardware for switching in accordance with layer 2, layer 3 or both. The switching logic 390 can include a forwarding information base (FIB 392), which can be programmed by the controller 330 to ensure packets are switched to the proper output port 382.

The control plane 310 further includes a routing information base (RIB) 394, which stores prefix information for network devices on the network. In the illustrated example, the memory 340 or a separate memory can include a list of attribute objects 396, wherein each attribute object has an associated local identifier, as previously described. The attribute objects can be maintained in ordered sets. When a new object is received, it is inserted into the list by walking the list (i.e., a linked list) until a worse attribute object is found and inserting the new attribute object before it. As a result, the controller generates an ordering of the plurality of attribute objects in a priority order based upon a best-path calculation. As shown at 398, when a prefix object is received, the controller 330 can use the attribute identifier within the prefix object as a key to searching the list of attribute objects 396. Once the associated attribute object is found, the controller 330 can use the attributes and associated prefixes in the prefix object 398 to update the RIB 394. Alternatively, the prefix object can be stored in memory 394 with the attribute object identifier and the associated attributes can be retrieved upon building the FIB. To build the FIB 392, the controller 330 walks the set of prefixes, reading each and examining the set of attribute IDs associated with it to determine which of the attribute IDs maps to the first attribute set in the attribute set list and then selecting its next-hop information. The FIB can then be programmed with the appropriate prefix and next hop.

Figure 4:
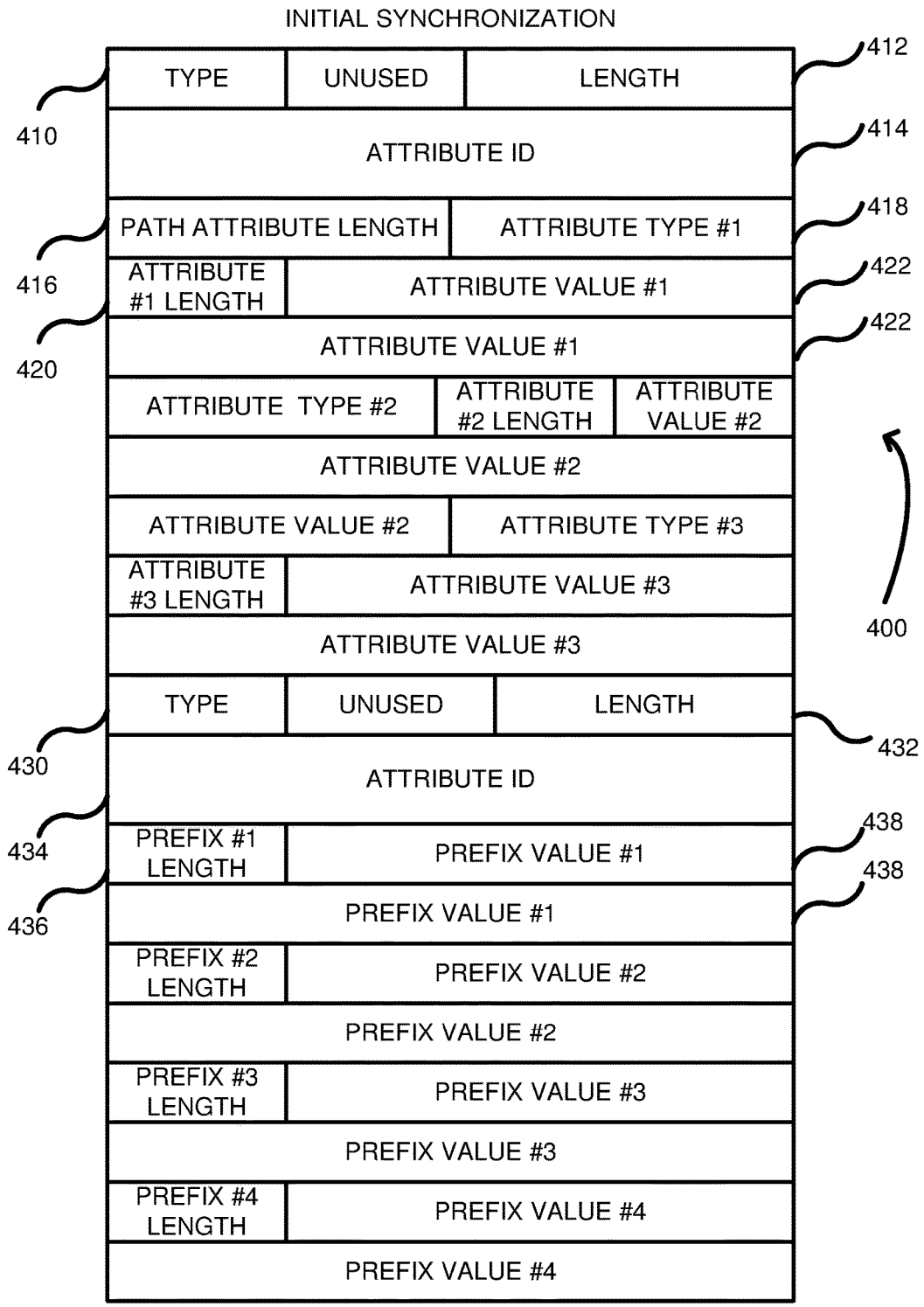
FIG. 4 is an example of a message used to initialize synchronization of attribute objects in a network device.

FIG. 4 is an example format for an object-based protocol that uses both attribute objects and prefix objects. In this example, during an initialization phase both attributes and prefixes can be used in a single message 400. A type field 410 can be used to identify an initialization type of message. A length field 412 can be used to describe a length of the attribute object portion of the message 400. An attribute ID 414 is an identifier that can be used in future transmissions to refer to the same set of attributes. A path attribute length 416 is a length of all the attributes. Each attribute can include an attribute type field, such as shown at 418, an attribute length field as shown at 420, and an attribute value field 422. Other attributes following the first attribute can have a similar structure. Following the attributes, prefix values can be positioned within a prefix object part of the message. A type field 430 can indicate that prefix values follow. A length field 432 is associated with the length of the prefix object. A prefix length 436 indicates a length of the prefix value fields 438. Subsequent prefix values have a similar structure. Using the initialization structure, attributes and prefixes can be associated with a same attribute ID. When a network device receives the initial synchronization message, it can parse the attribute identifier and the associated attributes and populate memory to generate the attribute object table, such as is shown at 120 in FIG. 1. Likewise, the RIB can be programmed using the prefixes from the prefix section and the associated attributes. In short, the initial synchronization message 400 includes both an attribute object and a prefix object in a single message.

Figure 5:
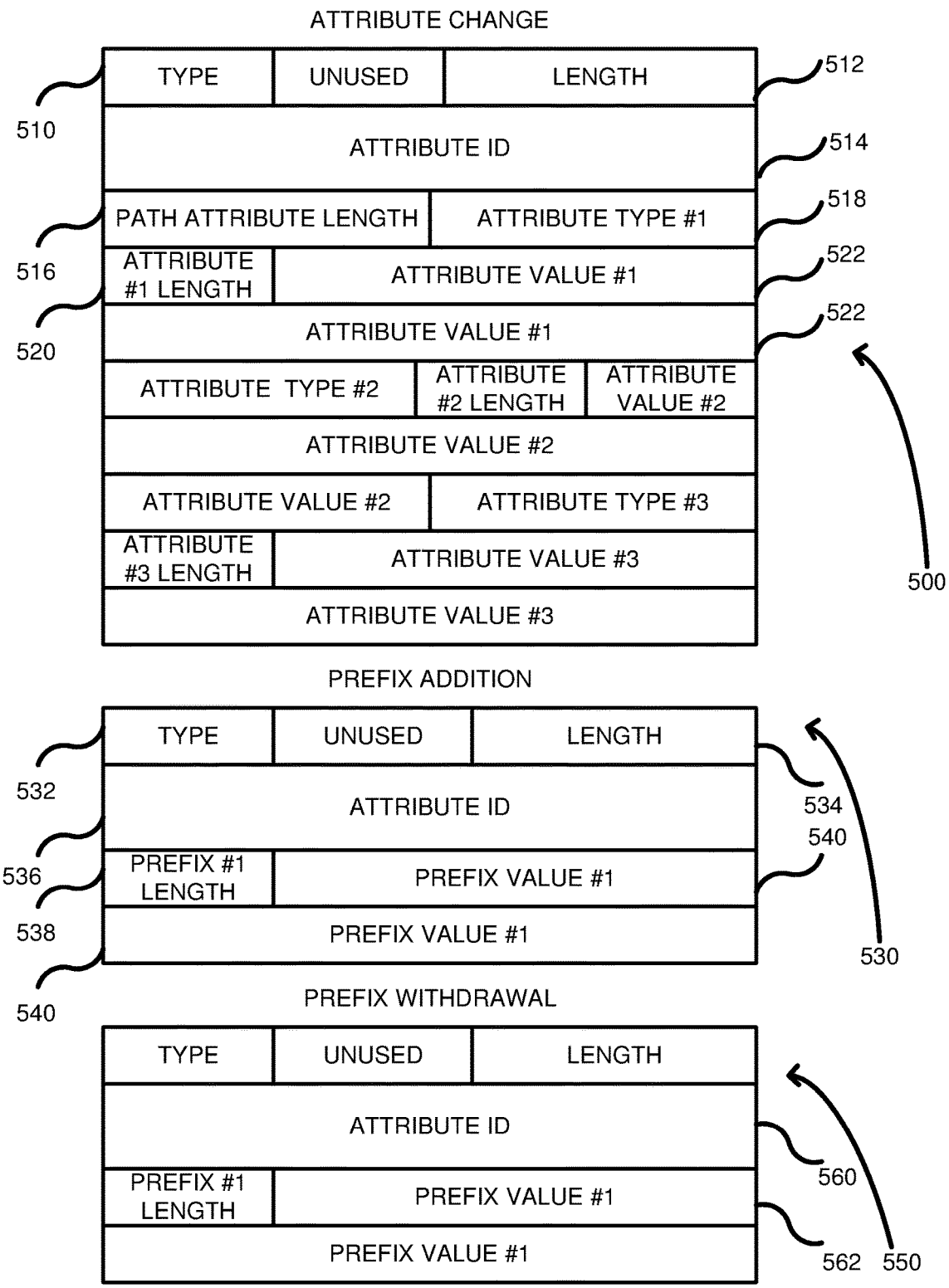
FIG. 5 includes example messages used to change attributes, add a prefix and withdraw a prefix.

FIG. 5 illustrates update messages that can be sent after the initial synchronization message. A first update message 500 is for a change of attributes. Notably, the attribute change message 500 includes only attributes and does not include prefixes. A first type field 510 indicates a change of attribute message. The length field 512 is for the length of the entire message. The attribute ID 514 is an identifier associated with a set of attributes included in the message 500. The path attribute length 516 represents the length of the attribute set within the message. The attribute type #1, shown at 518, indicates the attribute type for the first attribute, which can differ from other attribute types within the same message. The length 520 represents the length of the attribute value field 500. Any desired number of attributes can be included in the attribute change message 500, although the illustrated attribute change message includes three different attributes. When attributes are to be updated, the attribute change message 500 can be transmitted to a network device to modify an attribute object, such as one of the attribute objects 130 in FIG. 1. In this way, the attribute objects can change without re-transmitting prefixes. With the attribute object updated on the network device, all prefixes within the RIB are automatically updated as they are pointing to the updated attributed object.

In a similar fashion, an update message 530, which is a prefix addition message, can be used to update prefixes, without including the associated attributes. The type field 532 indicates that the type is a prefix addition. The length field 534 indicates a length of the message. The attribute ID 536 indicates the attribute set within the list of attributes associated with the prefix. For example, the attribute ID 536 points to one of the attribute objects 130 in the memory 120 in FIG. 1. Thus, even without listing any associated attributes, the identifier can be used to point to attributes already stored on the receiving device and associated with other prefixes when the prefix addition message is received. The prefix length field 538 describes a length of the value fields 540, which include the prefixes associated with the attribute identifier. In this way, one or more prefixes can be updated using only an attribute identifier.

An update message 550 is a prefix withdrawal message, which can be used to de-associate a prefix with an attribute. The similar fields of type and length are not described again to avoid redundancy. However, the attribute identifier 560 associates a prefix within a field 562 with an attribute set and such an association is to be ended. Accordingly, a receiving network device can search on a prefix within the RIB and ensure that any association is ended. In other embodiments, similar to the list 130 of attribute objects, there can be a table of prefixes with associated attribute identifiers. In such a case, the update message 550 results in a deletion of prefix from the table.

Figure 6:
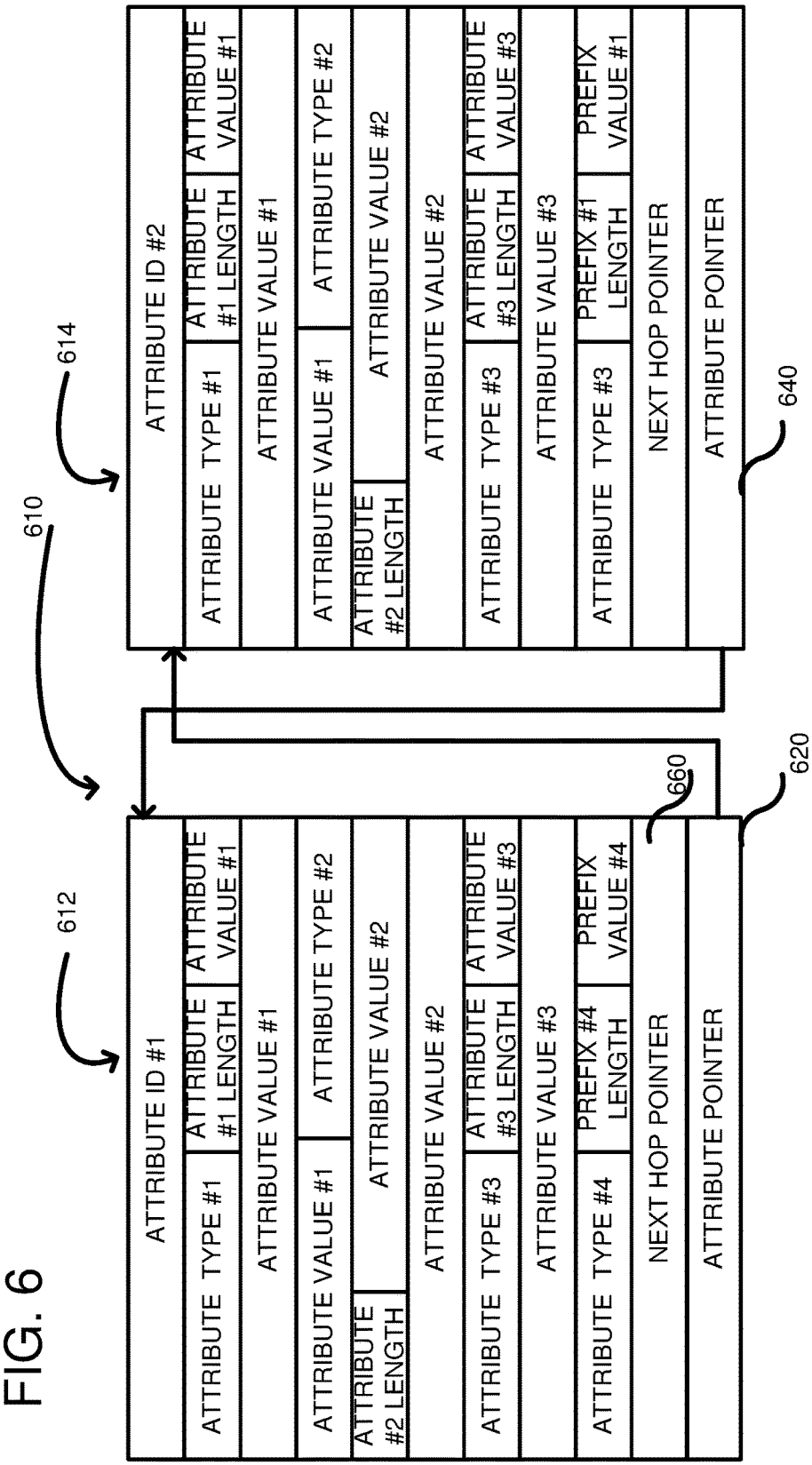
FIG. 6 is an example showing multiple attribute objects and how they can be stored in a memory.

FIG. 6 shows an embodiment indicating how attributes can be stored in memory, such as a list 130 of FIG. 1. Basically, attribute objects 610, including attribute objects 612, 614, can be stored in a linked list and can include a pointer to the next attribute object. The fields of the attribute objects 610 are similar to the fields described in relation to FIG. 5 at 500. Accordingly, each field is not described again. However, an attribute pointer field 620 within attribute object 612 is shown pointing to a next attribute object 614 in the list. The attribute object 614, likewise, includes a pointer 640 that points to attribute object 612. Thus, the attribute objects 610 form a doubly-linked list. The attribute objects 610 can also include a next-hop pointer 660 indicating an associated next hop. For any given prefix having multiple attribute IDs associated therewith, the controller can follow the attribute object pointers to walk through all of the associated attributes having matching IDs to determine which attribute object represents the best path. For example, a first attribute object is nominated as a current best, and as the controller progresses through the attribute objects, it determines if the next object is the current best. If the next object is the current best, then it is so nominated, otherwise, the next attribute object in the list is examined to determine which is the current best, and so on. This process continues until the end of the list is reached. In this way, the controller can generate an ordered set of attribute objects based on best path analysis. Once a best attribute object is determined, the prefix and the attribute objects next-hop information are pushed into the FIB. The controller can then iterate to the next prefix, performing the same analysis, until all of the prefixes are completed. When a new attribute object is received, it can be inserted into the list by walking the list until a worse attribute set is found, based on best path analysis, then inserting the new attribute object before the worse attribute object. The attribute pointers 620, 640 can be used to reorganize the attribute object set.

Figure 7:
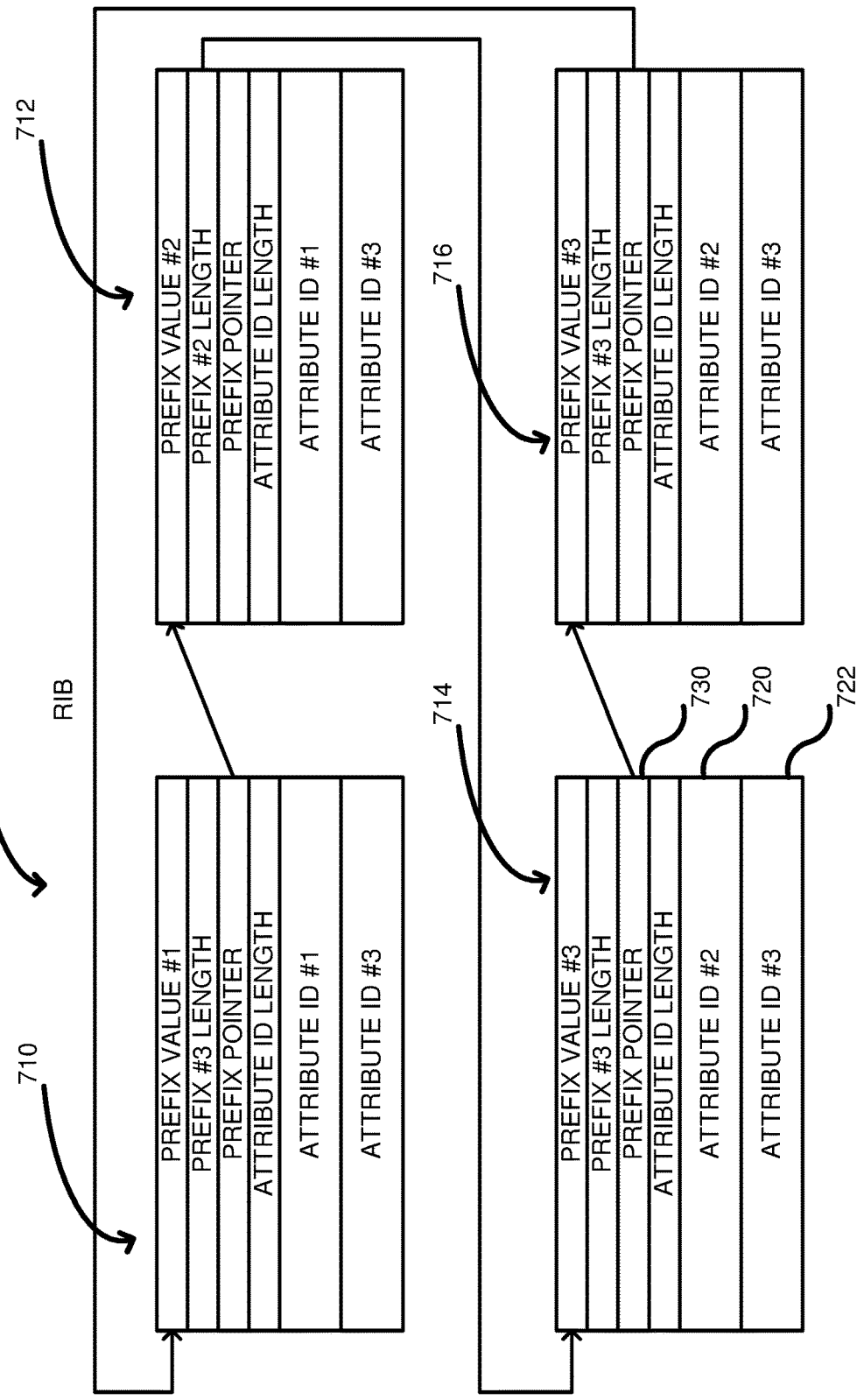
FIG. 7 is an example Routing Information Base (RIB) showing how multiple prefix objects can be stored in a memory.

FIG. 7 is an example of a RIB 700 that can be generated using the attribute objects. Rather than storing all of the attributes within the RIB, which can include duplicates, the RIB 700 includes prefix objects, 710, 712, 714, 716 that include attribute object identifiers, such as shown at 720, 722. Notably, each prefix object can have any number of attribute IDs, and in the illustrated example, each prefix object includes two separate attribute IDs. Additionally, each prefix object can include a pointer 730 to a next prefix object. The RIB thereby includes a linked list of prefixes with attribute identifiers that point to an attribute object within a list of attribute objects (see FIG. 1 at 130, for example). Using the RIB, the controller can thereby program the FIB using any desired best path algorithm. It is understood by those skilled in the art that the RIB typically includes thousands of prefix objects and FIG. 7 only shows four for ease of illustration. Any number of prefix objects can be included in the RIB.

Figure 8:
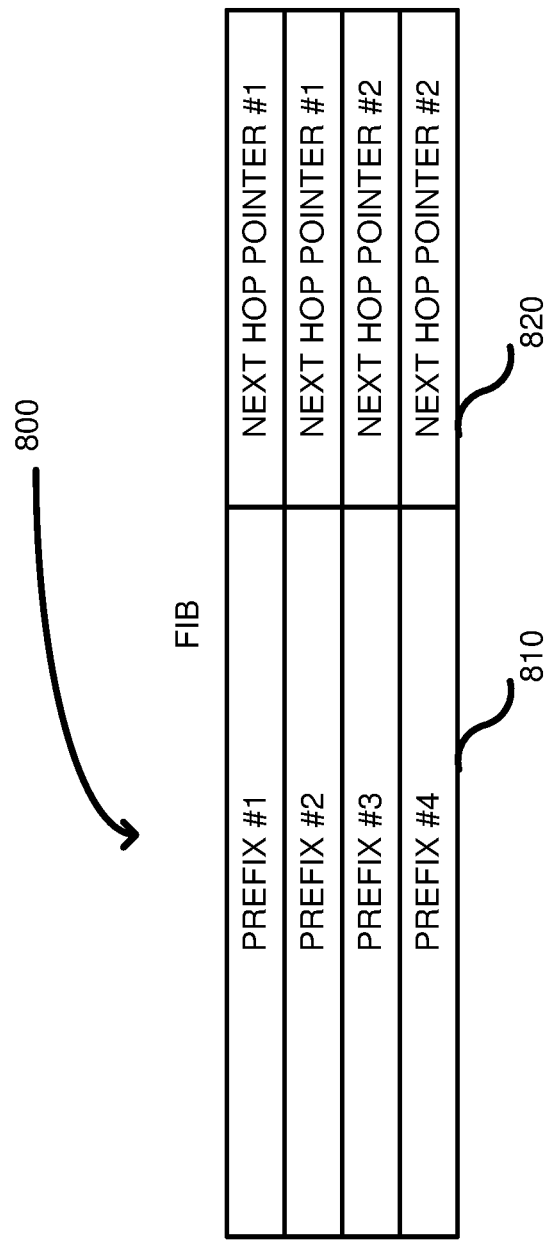
FIG. 8 is an example of a programmed forwarding information base (FIB) using the RIB of FIG. 7.

FIG. 8 is an example of a FIB 800 programmed by the controller. The FIB 800 includes an entry for each prefix being handled by the network device. Although only four prefixes are shown, there can be any number of prefixes and a network device typically handles thousands of prefixes. Each entry in the FIB can include a prefix, such as is shown at 810, and a corresponding next hop pointer, as is shown at 820. As discussed above in relation to FIG. 3, the FIB 392 is programmed by the controller 330 into the switching logic 390 to perform hardware control of switching packets from the input port 380 to the output port 382. It should also be noted that the FIB 800 includes a plurality of entries and each entry includes a field from a prefix object and a field from an attribute object. For example, the prefixes, such as 810, are retrieved from a prefix object in the RIB, and the next-hop pointers, such as shown at 820, are retrieved from the list of attribute objects.

Figure 9:
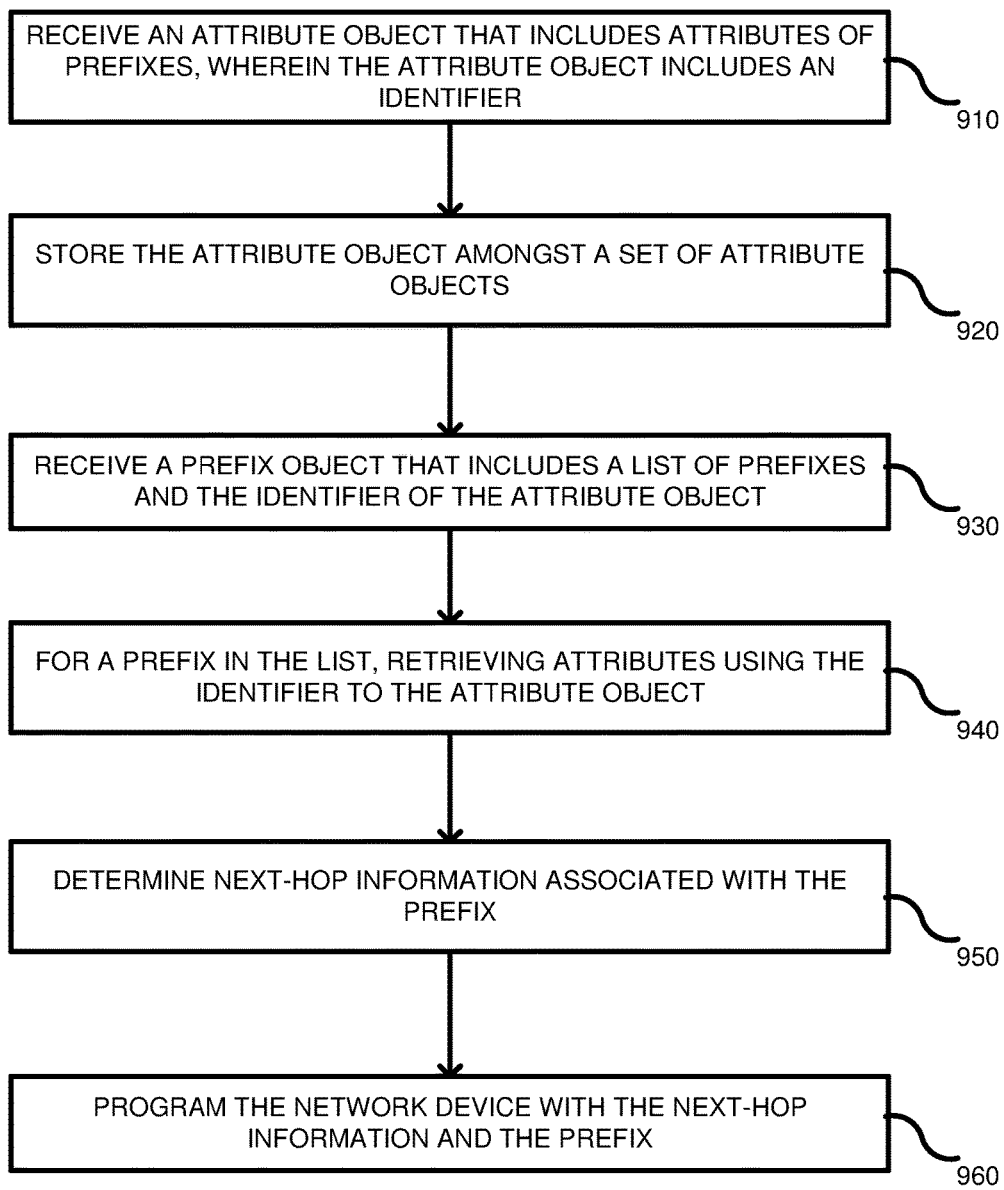
FIG. 9 is a flowchart of a method according to one embodiment for distributing prefixes and attributes in a network.

FIG. 9 is a flowchart of a method according to one embodiment for updating a network device. In process block 910, an attribute object is received by the network device that includes attributes of prefixes. Additionally, the attribute object includes an identifier of itself. As previously described, the attribute object need not include prefixes, but it can include prefixes in some cases. For example, in an initialization phase, shown in FIG. 4, the object 400 can include both an attribute object, starting at 410, and a prefix object, starting at 430. However, in other embodiments, the attribute object, such as is shown in FIG. 5, is prefix free and includes only attributes. In either case, the attribute object includes a plurality of attributes and an identifier to the attribute object. The identifier typically is a numeric value, but can be any desired identifier. In process block 920, the attribute object is stored amongst a set of attribute objects. For example, as shown in FIG. 1, the set of attribute objects is shown at 130 and can be stored in memory 120. There are a number of techniques to store the attribute objects in the memory 120. One example technique is a linked list as was described in FIG. 6. However, other techniques can be used, such as a static array. The attribute objects are stored in association with the identifier and the identifier can be used as a key for searching through the attribute objects, in some embodiments. In process block 930, a prefix object is received that includes a list of prefixes and an identifier, which is one of the identifiers associated with the attribute objects. In this way, the list of prefixes can be associated with attributes already stored on the network device. In process block 940, the network device can retrieve, for each prefix, attributes using the identifier. Thus, using the object oriented approach to attributes and prefixes, multiple attributes can be assigned to a prefix by merely associating one or more attribute identifiers to the prefix. In process block 950, next-hop information can be determined associated with the prefix. To determine the next hop, the list of attribute objects can be accessed, such as the list shown at 130 in FIG. 1. Using best path analysis, the list of attribute objects can be sorted or otherwise used to determine a next hop for any prefix. Moreover, the next-hop pointer 660 (FIG. 6) can be used in identifying the next hop. Finally, in process block 960, the network device can be programmed with the next-hop information and the associated prefix. For example, returning to FIG. 3, the FIB 392 can be programmed so that future packets can be routed using the FIB to the proper output port.

Figure 10:
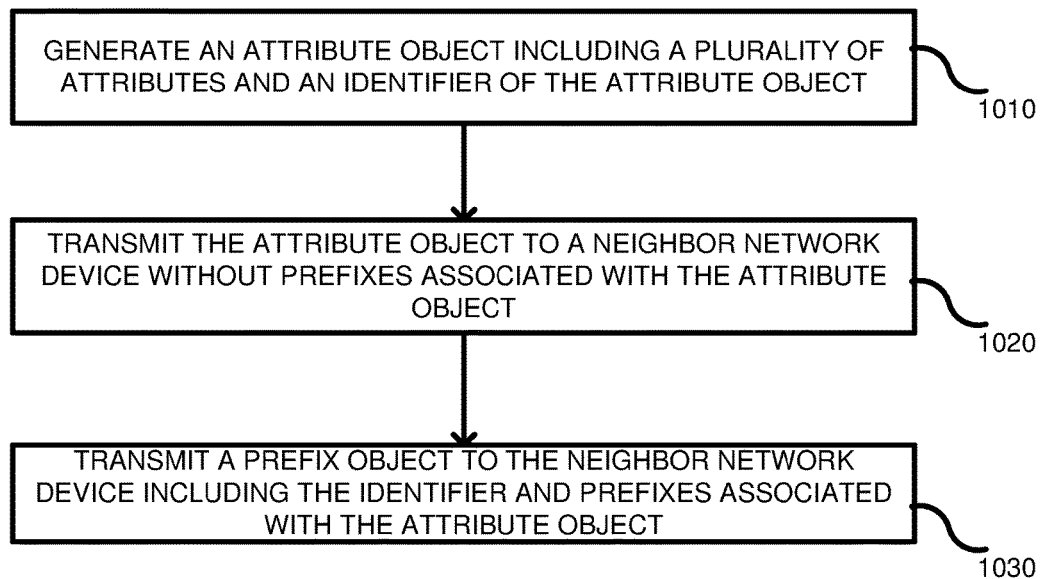
FIG. 10 is a flowchart of a method according to another embodiment for distributing prefixes and attributes in a network.
Figure 11:
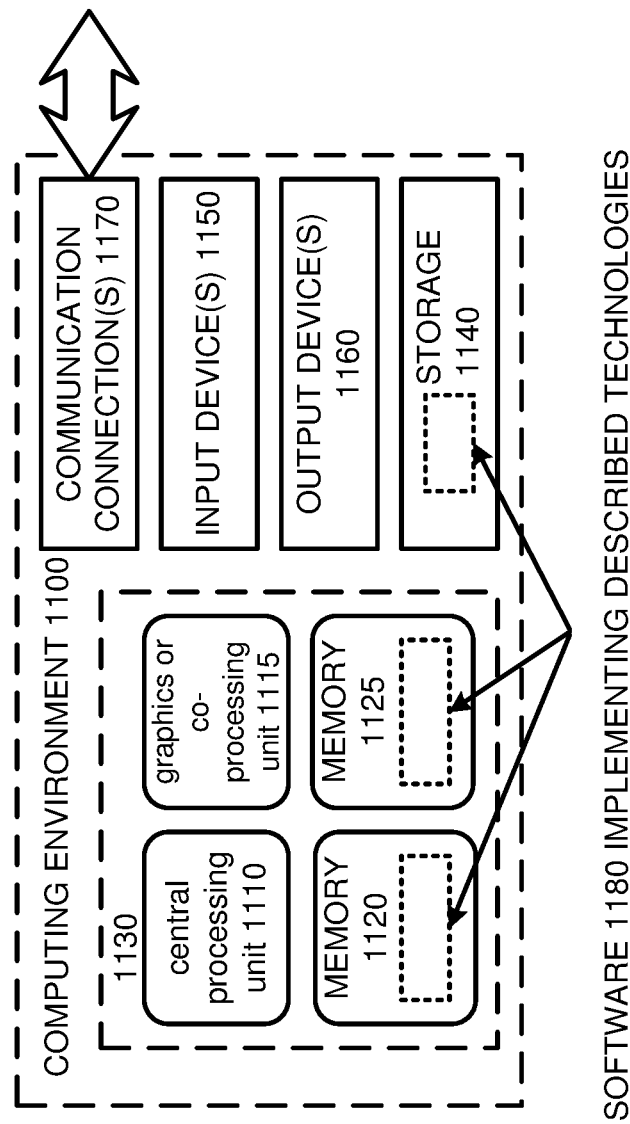
FIG. 11 depicts a generalized example of a suitable computing environment in which the described innovations may be implemented.

FIG. 10 is another embodiment of a method for updating a network device. In process block 1010, an attribute object is generated by a network device including a plurality of attributes and an identifier of the attribute object. In one example embodiment, the transmitting network device determines the identifier and uses the same identifier when transmitting prefix updates. Another embodiment includes that the receiving network device generates the identifier and transmits the identifier back to the originating device. In either case, attributes are associated with an identifier and both the generating and receiving network devices have knowledge of the identifier. In process block 1020, the attribute object is transmitted to a neighbor network device without prefixes associated with the attribute object. Thus, the attributes and identifier of the attribute object are received by the neighbor network device, but there is not yet an association of what prefixes are linked to the attributes. In process block 1030, a subsequent message that is transmitted to the neighbor network device includes a prefix object including the identifier to the attribute object so that the prefixes are associated with the attribute object. Thus, the neighbor device has the prefixes and associated attributes, which can be used in making best-path calculations FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., router, switch, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of updating a router or a switch, the method comprising:
    receiving an attribute object, from a neighbor router or switch, that includes attributes associated with network address prefixes, wherein the attribute object includes a plurality of attributes and an identifier of the attribute object, without including a prefix;
    storing the attribute object in a set of attribute objects within the router or switch;
    receiving a prefix object, from the neighbor router, separate from the attribute object, that includes a list of prefixes and the identifier to the attribute object;
    for a prefix in the list of prefixes, retrieving attributes from the set of attribute objects using the identifier to the attribute object;
    determining next-hop information associated with the prefix and the retrieved attributes; and
    programming the router or switch with the next-hop information and the prefix.

2. The method of claim 1, wherein the receiving of the attribute object is in a first received transmission and the receiving of the prefix object is within a second received transmission, separate from the first received transmission.

3. The method of claim 1, further including determining which attribute object within the set of attribute objects represents a best path and using the next-hop information for the attribute object that represents the best path.

4. The method of claim 1, further including updating the prefix's attributes upon receiving an updated attribute object with the identifier therein, comparing other attribute objects associated with the prefix object to the updated attribute object and determining if the updated attribute object represents a better path for the prefix object than the other attribute objects.

5. The method of claim 1, wherein the prefix object is a first prefix object, and the method further includes receiving a second prefix object including a new prefix, wherein the second prefix object includes the identifier of the attribute object without the plurality of attributes, and wherein the second prefix object is used to re-program the router or switch.

6. One or more computer-readable storage including instructions that upon execution cause a network device to:
    generate, within the network device, an attribute object including a plurality of attributes and an identifier of the attribute object;
    transmit the attribute object to a neighbor network device, without prefixes associated with the attribute object; and
    in a subsequent message after the attribute object is transmitted, transmit a prefix object to the neighbor network device including the identifier to the attribute object together with prefixes associated with the attribute object.

7. The one or more computer-readable storage according to claim 6, wherein the instructions, upon execution, further cause the network device to:
    update attributes on the neighbor network device by transmitting an updated attribute object with the identifier.

8. The one or more computer-readable storage according to claim 6, wherein the attributes include origin of the attribute object; autonomous system (AS) path; or next hop information.

9. The one or more computer-readable storage of claim 6, wherein the instructions, upon execution, further cause the network device to:
    generate an updated prefix object including the identifier of the attribute object and a list of prefixes that are associated with the plurality of attributes of the attribute object.

10. The one or more computer-readable storage according to claim 6, wherein the instructions, upon execution, further cause the neighbor network device to:
    receive the attribute object and store the attribute object in a plurality of attribute objects;

receive the prefix object including the identifier to the attribute object; and program the neighbor network device by correlating the prefixes with attributes within the attribute object using the identifier.

11. The one or more computer-readable storage according to claim 10, wherein the instructions, upon execution, further cause the neighbor network device to:

route packets using the programmed neighbor network device.

12. The one or more computer-readable storage according to claim 10, wherein the instructions, upon execution, further cause the neighbor network device to:

order the plurality of attribute objects in a priority order based upon a best-path calculation; and wherein the programming of the neighbor network device is based upon the best-path calculation.

13. The one or more computer-readable storage according to claim 6, wherein the attribute object and the prefix object are transmitted on separate transmissions to the neighbor network device.

14. The one or more computer-readable storage according to claim 6, wherein the attributes are associated with an implementation of Border Gateway Protocol (BGP) and the network device is a router.

15. A network device, comprising:

an input port and an output port;

a data plane including switching logic to switch network traffic between the input port and the output port within the network device;

a control plane including a controller and a memory; and wherein the controller is configured to store a plurality of attribute objects within the memory, wherein a given attribute object includes an identifier and an attribute associated with the identifier without prefixes, wherein prefixes, received by the network device after the plurality of attribute objects are stored, include references to the identifiers and the controller is configured to associate at least one of the plurality of attribute objects to the prefixes using the identifiers.

16. The network device of claim 15, wherein the controller is further configured to program the switching logic using best-path analysis on the associated plurality of attribute objects and the prefixes.

17. The network device of claim 15, wherein the controller is configured to receive an updated attribute object to replace a previously stored attribute object, wherein the updated attribute object includes an identifier that matches the previously stored attribute object identifier but does not include prefixes.

18. The network device of claim 17, wherein the controller re-computes a best path for each of the prefixes associated with the updated attribute object through the identifier.

19. The network device of claim 15, wherein the network device is a router.

20. The network device of claim 15, wherein the network device is configured to communicate with neighbor network devices using an implementation of Border Gateway Protocol (BGP).

* * * * *